Aug. 24, 1954
F. LANG
2,687,121
DIESEL ENGINE
Filed Dec. 27, 1950
2 Sheets-Sheet 1
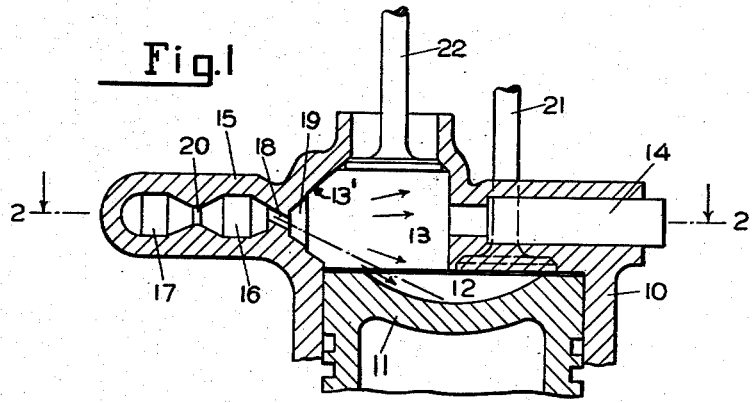
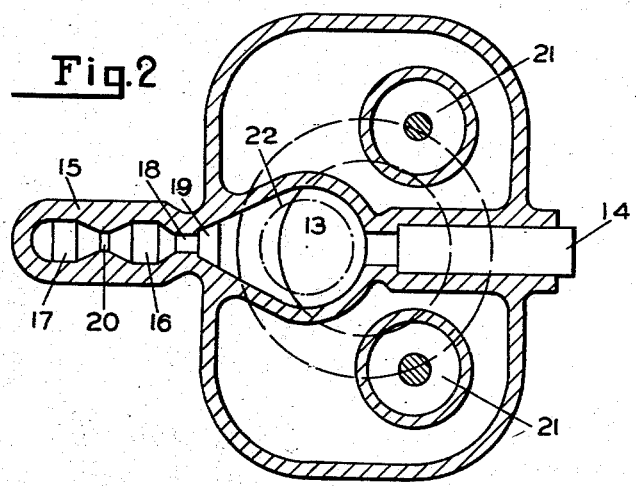
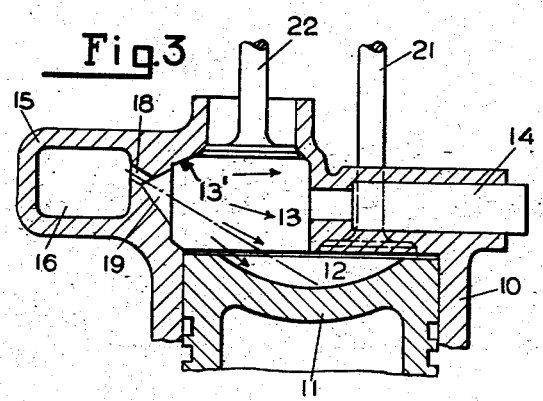
INVENTOR.
FRANZ LANG Aug. 24, 1954        F. LANG        2,687,121

DIESEL ENGINE

Filed Dec. 27, 1950        2 Sheets-Sheet 2

INVENTOR.
FRANZ LANG
BY

Patented Aug. 24, 1954

2,687,121

UNITED STATES PATENT OFFICE 2,687,121

DIESEL ENGINE

Franz Lang, Munich, Germany, assignor to Durex S. A., Geneva, Switzerland, a corporation of Switzerland Application December 27, 1950, Serial No. 202,936

4 Claims. (Cl. 123—32)

My invention relates to diesel engines and more particularly to diesel engines comprising a combustion chamber with energy cell arranged in the cylinder head. In engines of that type fuel is injected across the combustion chamber towards the throat leading from said chamber into the energy cell which may be a single or double cell. A portion of the fuel entering said cell ignites rapidly therein and the remaining portion of the fuel is blown violently back into the combustion chamber where it meets the swirling mixture of air and fuel whereupon the combustion in the chamber is completed. Though diesel engines of the type described proved valuable in practice they still have certain disadvantages particularly a relatively slow and uneven combustion resulting from an incomplete and non-uniform mixture of the fuel and air in the combustion chamber and in the adjoining cylinder space above the piston.

The main object of my invention is to avoid these disadvantages and to ensure a quick, uniform and complete combustion of the fuel. To this effect the combustion chamber which is arranged in the cylinder head and communicates through its open bottom with the cylinder space is enclosed by side walls diverging from the cell opening to provide substantially pear-shaped cross sections of said chamber in planes perpendicular to the cylinder axis and by a top wall which is inclined against the longitudinal axis of the energy cell to diverge therefrom in the direction away from said throat and extending in such inclined position to make the height of the combustion chamber a maximum at the combustion chamber wall opposing said throat. In addition thereto the longitudinal axis of the cell opening is preferably directed into a concavity in the crown of the engine piston which concavity enlarges the said combustion chamber.

The novel features which I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing.

In the drawing:

Fig. 1 shows an elevational section through the cylinder head portion of a diesel engine according to my invention.

Fig. 2 shows a cross section thereof along line 2—2 of Fig. 1.

Figs. 3 through 5 show elevational sections of three additional embodiments of the cylinder head portions used by my new engine.

The same reference characters indicate the same parts in all figures.

Figure 4:
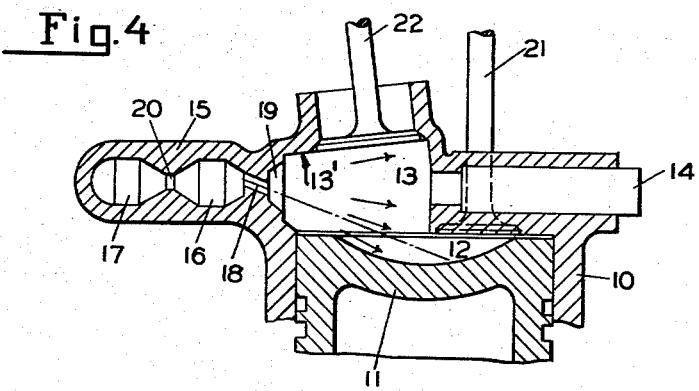

Figs. 1 and 2 illustrate the cylinder head 10 and the concave crowned engine piston 11. The cylinder head 11 includes a single-lobe combustion chamber 13, a conventional fuel injector 14 and the energy cell body 15. This energy cell body contains an inner cell 16 and an outer cell 17 which are interconnected by a narrow venturi 20. A throat 18 terminating into a funneled extension 19 leads from the inner cell 16 into the combustion chamber 13. The air valves are indicated with 21. The exhaust valve 22 is situated in the top wall of the combustion chamber 13. This top wall at least in its portion 13' neighboring said throat opening 19 is inclined against the longitudinal axis of the energy cell to diverge therefrom in the direction towards the cylinder axis. The side walls of the combustion chamber 13, particularly in cross sections perpendicular to the cylinder axis, extend as shown in Fig. 2 in a pear-shaped manner from the funneled mouth 19 essentially in concert with the expanding jet gases emanating therefrom. Thus dead spaces within the combustion chamber, especially near said mouth 19, are avoided and the jet issuing from the energy cell mixes safely and completely with the content of the combustion chamber. The throat 18, as seen from Fig. 1, is so inclined that the jet emanating therefrom is directed towards the opening between the combustion chamber 13 and the cylinder space and thus a portion of said jet is forced to mix with the air above the piston 11, particularly in the concave head space 12 thereof.

In the embodiment illustrated in Fig. 3 the energy cell body 15 contains only one cell 16. Whereas in the embodiment illustrated in Figs. 1 and 2 the longitudinal axes of the fuel injector 14 and of the energy cell body 15 are in alignment, in the embodiment shown in Fig. 3 these axes are displaced in a vertical plane so that the fuel thrust by the injector 14 across the combustion chamber 13 impacts upon the wall of the throat extension 19.

The embodiment illustrated in Fig. 4 differs from that shown in Figs. 1 and 2 therein that the full top wall 13' of the combustion chamber is inclined against the longitudinal axis of the energy cell in the manner described above.

Figure 5:
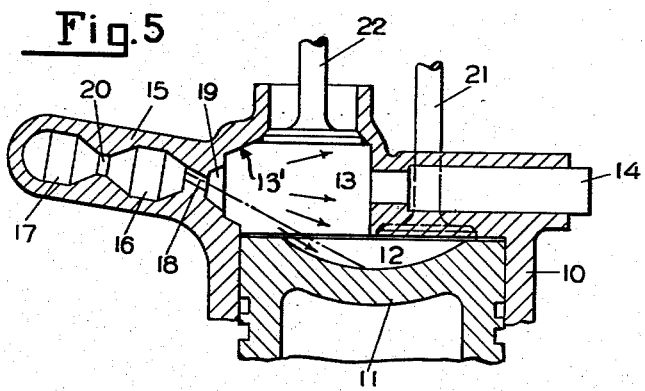

The embodiment illustrated in Fig. 5 differs from that shown in Figs. 1 and 2 therein that the longitudinal axis of the energy cells 16 and 17 is inclined similarly though less than the axis of the throat 18 against the opening between the combustion chamber 13 and the cylinder space.

Figure 6:
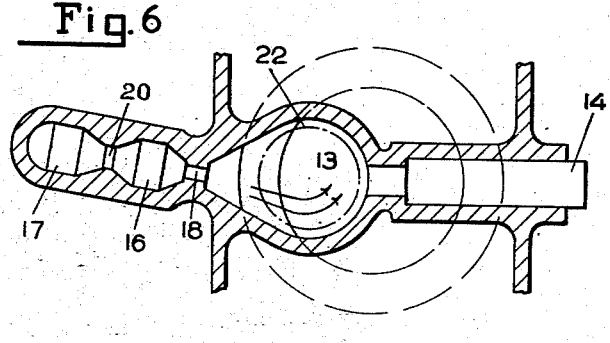
Fig. 6 shows a modified cross section along line 2—2 in Fig. 1.

The embodiment shown in Fig. 6 differs from the embodiment shown in Figs. 1 and 2 therein that the longitudinal axes of the energy cells 16 and 17 and of the throat 18 enters the pear shaped combustion chamber 13 tangentially thereto that is approximately parallel to one side wall of the pear shaped combustion chamber 13 so that a whirling motion of the air and fuel mixture in the circular or spherical portion of said chamber 13 is effected as indicated by the arrows.

The different features of the embodiments described above may, of course, be combined in a single embodiment.

While specific embodiments of my invention have been shown and described in detail to illustrate the application of the principles of my invention, it will be understood that the same may be otherwise embodied without departing from such principles and without avoiding the scope of the appended claims.

What I claim as my invention is:

1. In a diesel engine of the type described the combination comprising an engine cylinder; a cylinder head; a single-lobe combustion chamber in said cylinder head set off to one side of the cylinder axis; a fuel injector and an energy cell opening in opposing positions into said combustion chamber; a funnel shaped throat between the energy cell and the combustion chamber; side walls of the combustion chamber diverging from said throat to provide substantially pearshaped cross sections of said chamber perpendicular to the cylinder axis; and a top wall of the combustion chamber inclined relative to the longitudinal axis of the energy cell to diverge therefrom in the direction away from said throat and extending in such inclined position to make the height of the combustion chamber a maximum at the combustion chamber wall opposing said throat.

2. In a diesel engine of the type described the combination comprising an engine cylinder; a cylinder head; a single-lobe combustion chamber in said cylinder head set off to one side of the cylinder axis; a fuel injector and an energy cell opening in opposing positions into said combustion chamber; a funnel shaped throat between the energy cell and the combustion chamber; side walls of the combustion chamber diverging from said throat to provide substantially pearshaped cross sections of said chamber perpendicular to the cylinder axis; a top wall of the combustion chamber inclined relative to the longitudinal axis of the energy cell to diverge therefrom in the direction away from said throat and extending in such inclined position to make the height of the combustion chamber a maximum at the combustion chamber wall opposing said throat; and a piston reciprocating in the engine cylinder; a concavity in the crown of said piston enlarging the combustion chamber; the longitudinal axis of the throat between the energy cell and the combustion chamber being directed into said concavity.

3. In a diesel engine of the type described the combination comprising an engine cylinder; a cylinder head; a single-lobe combustion chamber in said cylinder head set off to one side of the cylinder axis; a fuel injector and an energy cell opening in opposing positions into said combustion chamber; a funnel shaped throat between the energy cell and the combustion chamber; the side walls of the combustion chamber diverging from said throat to provide substantially pearshaped cross sections of said chamber perpendicular to the cylinder axis; the top wall of the combustion chamber inclined relative to the longitudinal axis of the energy cell to diverge therefrom in the direction away from said throat and extending in such inclined position to make the height of the combustion chamber a maximum at the combustion chamber wall opposing said throat, and at least one exhaust valve seated in said top wall above the bellied portion of the pearshaped cross section of the combustion chamber.

4. In a diesel engine of the type described the combination comprising an engine cylinder; a cylinder head; a single-lobe combustion chamber in said cylinder head set off to one side of the cylinder axis; a fuel injector and an energy cell opening in opposing positions into said combustion chamber; a funnel shaped throat between the energy cell and the combustion chamber; the longitudinal axis of said injector and of said energy cell being so out of alignment that the jet from said injector impinges upon the wall of the funnel shaped throat, side walls of the combustion chamber diverging from said throat to provide substantially pearshaped cross sections of said chamber perpendicular to the cylinder axis; and a top wall of the combustion chamber inclined relative to the longitudinal axis of the energy cell to diverge therefrom in the direction away from said throat and extending in such inclined position to make the height of the combustion chamber a maximum at the combustion chamber wall opposing said throat.

References Cited in the file of this patent

UNITED STATES PATENTS

| Number | Name | Date |
| --- | --- | --- |
| 2,080,139 | Lang | May 11, 1937 |
| 2,281,685 | Fischer | May 5, 1942 |
| 2,408,394 | Guerasimoff | Oct. 1, 1946 |
| 2,414,225 | Ericson | Jan. 14, 1947 |
| 2,436,855 | Culbert | Mar. 2, 1948 |
| 2,442,664 | Roensch | June 1, 1948 |

FOREIGN PATENTS

| Number | Country | Date |
| --- | --- | --- |
| 714,411 | France | Nov. 13, 1931 |
| 367,457 | Great Britain | Feb. 25, 1932 |